May 23, 1972     D. GUYTON     3,664,631
CYLINDRICAL LENS SYSTEMS FOR SIMULTANEOUS BIMERIDIONAL
MEASUREMENT IN A LENS MEASURING INSTRUMENT
Filed Feb. 25, 1970

INVENTOR
DAVID GUYTON
BY
ATTORNEY

United States Patent Office 3,664,631
Patented May 23, 1972

3,664,631
CYLINDRICAL LENS SYSTEMS FOR SIMULTANEOUS BIMERIDIONAL MEASUREMENT IN A LENS MEASURING INSTRUMENT
David Guyton, 460 Walnut St., Brookline, Mass. 02160
Filed Feb. 25, 1970, Ser. No. 14,051
Int. Cl. A61b *3/00, 3/02*
U.S. Cl. 351—27
9 Claims

ABSTRACT OF THE DISCLOSURE

In a lens measuring instrument or optometer of the type employing a target, scale, and converging lens for measuring the power of a lens or the power error of an eye in two principal meridians, a pair of interposed cylindrical lens systems having orthogonal axes are disclosed for separating the target into two individually movable image segments. The lens systems are disposed such that one orthogonal target image segment may be moved through the plane of the other facilitating simultaneous power measurement of the two meridians and allowing the use of a plurality of types of targets.

BACKGROUND OF THE INVENTION

Field of the invention

The invention resides generally in the field of lens measuring instruments for measuring the power of lenses and in optometers for refracting or measuring the power error of the eye.

DESCRIPTION OF THE PRIOR ART

Instruments which are the subject of the present invention are well known in the prior art. They are based on the principle of using a target in conjunction with a converging lens and scale to stimulate in a specified plane a continuously variable lens having both converging and diverging power ranges. This simulated lens is used to neutralize the power of the lens under test be it the power of an optical lens or the power error of the eye. The subject lens under test is positioned coincident with or near the plane of the simulated lens whose power is varied by moving the target along the scale until neutralization, that is, target focus or alignment, is detected by a viewing system through the subject lens. The power of the lens or power correction for the eye is then read from the scale.

In the case of optical lens measuring instruments, the above named viewing system is most commonly a low power telescope used in conjunction with an observer's eye, the telescope serving a magnify greatly any deviation from the neutralization condition of focus or alignment. In the case of optometers, the viewing system consists solely of that part of the subject's eye which focuses parallel ray bundles onto the retina, and the simulated lens is equivalent to a corrective spectacle lens which would be used to neutralize the power error of the eye to allow normal distance vision, that is, the ability to form images of distance objects on the retina.

Spherocylindrical lenses and astigmatic eyes are encountered when using these instruments, and it is therefore desirable in these instruments to be able to measure power in the two principal meridians of the subject lens simultaneously. Every spherocylindrical lens may be resolved into two cylindrical lens components with axes at right angles to each other. The principal meridians of the lens coincide with these two axes. A spherocylindrical lens is described completely by specifying the orientation of the principal meridians and the power acting in each principal meridian, that is, the power of each of the cylindrical components.

Simultaneous power measurement in the two principal meridians, that is, measurement of power in the second principal meridian while the instrument remains adjusted for power in the first principal meridian, requires that the target used in the instrument be separated into two orthogonal target segments independently movable axially. Each target segment is oriented approximately for power measurement in its corresponding principal meridian. Since it is usually not previously known which principal meridian of the subject lens has the more or less power, it is desirable to provide two orthogonal target segments each of which is independently movable through the plane of the other. With such target segments, the power of either principal meridian may be measured first since the second target segment, in then measuring the power in the second principal meridian, may move axially to either side of the first target segment, measuring more or less power.

Means for separating a target into two independently axially movable target segments are known in the prior art. For example, U.S. Pat. 1,070,631, describing an optometer, issued to G. A. Rogers, shows the use of two crossed cylindrical lenses having orthogonal axes located on the posterior side of the converging lens system, posterior being towards the target end of the instrument, which cylindrical lenses image a distant target into the object space of the converging lens system. Each cylindrical lens forms in an image plane coinciding with its principal focal plane an image segment of the target which image segment is aligned with the axis of the cylindrical lens. This system does not allow one target image segment to be moved through the plane of the other because the two cylindrical lenses have equal focal lengths and thus the two image planes are equal distances from the two cylindrical lenses.

Other means have been devised which provide two independently movable orthogonal target segments capable of passing through the plane of one another. U.S. Pat. 1,542,112 issued to E. D. Tillyer describes the use of a cylindrical lens to image a first line target at a constant axial displacement from the actual first line target on the posterior side of the converging lens. This line target image may then be moved through the plane of a second line target. U.S. Pat. 1,204,030 issued to G. Kellner shows the use of a spherical lens moving with a line target to accomplish the same purpose. Both systems are limited to line targets, and both require that the target and imaging lens move fixedly together axially to maintain appropriate scale calibration.

SUMMARY OF THE INVENTION

The present invention is directed to apparatus which, in instruments of the character described above, allows simultaneous power measurement in both principal meridians, allows the use of a plurality of different types of targets, and allows the power determination in either principal meridian prior to the other.

This is accomplished by the placement of two cylindrical lens systems with orthogonal axes between the target and the converging lens such that each cylindrical lens system forms in an image plane an image segment of the target each of which image segments when appropriately aligned with a principal meridian of the subject lens acts in combination with the converging lens and the scale to measure the refractive power of the subject lens in that meridian. Appropriate adjusting means are provided for the relative positioning of the target and the two cylindrical lens systems such that the image segments may be moved along the axis of the instrument over a selected range independently of each other. The cylindrical lens systems and the adjusting means are designed such that the image planes of the two target image segments may be moved through one another facilitating the simultaneous measurement of power in the two principal meridians. More specifically, and as will be described below, a first cylindrical lens system and the target are positioned relative to each other such that a first target image segment is projected in a first image plane in a position to neutralize one principal meridian of the subject lens in conjunction with the converging lens. This may be anywhere within the selected range of the instrument. The second cylindrical lens system is then positioned relative to the target to project a second target image segment in a second image plane anywhere within a selected range about the image plane of the first target image segment in order to neutralize, in conjunction with the converging lens, the second principal meridian of the subjcet lens. As will be seen, a variety of cylindrical lens systems may be used.

The invention is not limited to the use of line targets as in prior art designs. Any target which might prove useful in bimeridional refractive power measurement may be used, a visual acuity chart target for example. It is useful, but not necessary, to provide for a linear relationship between the axial movement of each target image segment and the movement of the adjusting means. With an appropriate arrangement of this type, a single linear instrument scale may be used which is significantly easier to manufacture and which facilitates the reading of the meridional refractive power values from the instrument. It is also useful, but not necessary, to provide for equal magnification relative to the target of the two target image segments such that the final target image, as seen by the observer, is not distorted.

The above advantages are all incorporated in three different embodiments of the present invention. In two of these embodiments the target is stationary, and the cylindrical lens systems are axially movable. In the third embodiment, one of the cylindrical lens systems is stationary with the target and elements of the other cylindrical lens system axially movable.

The foregoing description of the present invention will become more apparent from the following detailed specification when read in conjunction with the accompanying drawing.

DESCRIPTION OF THE PREFERRED EMBODIMENTS

Figure 1:
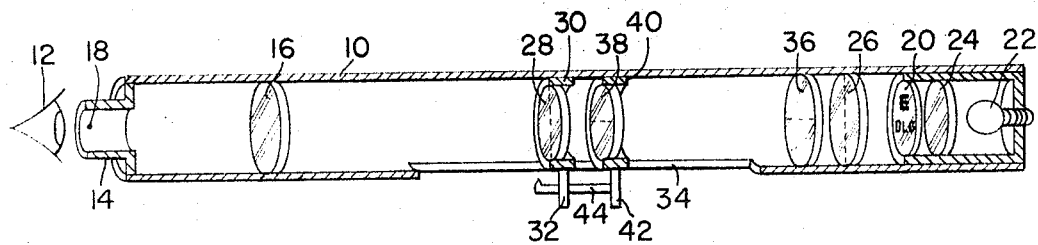
FIG. 1 is a cross-sectional view of one embodiment of the invention in an optometer.

Referring to FIG. 1, there is shown an optometer which utilizes one embodiment of the present invention. The instrument is contained in tube 10 which is rotatably mounted by any conventional means not shown. The lens to be measured in this case is the power error of the eye 12 located to the left of, or anterior to eyepiece 14 and positioned at a known fixed distance from eyepiece 14. The viewing system for determining the condition of neutralization in this arrangement consists of that part of the eye 12 which images parallel ray bundles onto the retina. It is to be understood that the lens to be measured could just as easily be an optical lens, in which case the viewing system would consist of a low power telescope in conjunction with an observer's eye positioned at a convenient distance to the left of, or anterior to, the optical lens.

Converging lens 16 is mounted in tube 10 such that its anterior principal focus coincides with point 18 on the optical axis of the instrument, the point being a selected distance from the eye 12. This selected distance is commonly known as the vertex distance of refraction or the distance from the eye at which a corrective spectacle lens is placed in normal use. By calibrating the instrument to this point, a scale in diopters of correction is obtained which is linear with respect to target movement.

Target 20, a visual acuity chart for example, is mounted in tube 10 and is illuminated by light source 22 through diffusing plate 24. Collimating cylindrical lenses 26 and 36 with different focal lengths are mounted with axes orthogonal in tube 10 positioned their respective focal lengths anterior to target 20. These collimating lenses are not necessary for the operation of the instrument, but they do enable linear movement relationships between the image planes and the adjusting handles as explained below and also provide a means to obtain equal magnifications of the two target image segments as explained below. A first cylindrical lens system consisting of converging cylindrical lens 28 is positioned within tube 10 between lens 26 and converging lens 16 with its axis aligned with that of lens 26. Lens 28 is mounted in holder 30 which is movable axially by means of handle 32 extending through slot 34 in tube 10. This first cylindrical lens system forms a first image segment of collimated target 20 in a first image plane which coincides with the anterior principal focal plane of lens 28 regardless of the axial position of lens 28. Thus, the first image segment moves axially at the same rate as lens 28, a linear movement relationship, and the first image plane is always a fixed distance from lens 28, this distance equal to $f_{28}$. Also, the first image segment has a constant magnification relative to target 20 equal to $f_{28}/f_{26}$ where $f_{28}$ is the focal length of lens 28, and $f_{26}$ is the focal length of lens 26.

A second cylindrical lens system consisting of converging cylindrical lens 38 is positioned with tube 10 between target 20 and lens 16 with its axis aligned with that of lens 36. Lens 38 is mounted in holder 40 which is movable axially by means of handle 42 extending through slot 34 in tube 10. This second cylindrical lens system forms a second image segment of collimated target 20 in a second image plane which coincides with the anterior principal focal plane of lens 38. The second image segment thus moves axially at the same rate as lens 38, a linear movement relationship, and the second image plane is always a fixed distance from lens 38, this distance equal to $f_{38}$. Also, the second image segment has a constant magnification relative to target 20 equal to $f_{38}/f_{36}$.

$f_{38}$ is made greater than $f_{28}$ permitting the axial movement of the second image plane, which is separated from lens 38 by a distance equal to $f_{38}$, throughout a range which passes through and to either side of the first image plane, which is separated from lens 28 by a distance equal to $f_{28}$. Also, the focal lengths of lenses 26, 28, 36 and 38 are chosen such that the magnifications of the image segments in the two meridians are equal, i.e. $f_{28}/f_{26}=f_{38}/f_{36}$.

A scale, not shown, is attached to the outside of tube 10 along slot 34 and is calibrated to read at such position of lenses 28 and 38 the power which the instrument simulates in each of the two meridians at point 18. By means of extension arm 44 attached to handle 42 to correct for the difference in position of image planes from handles 32 and 42, a single scale may be used with index marks on handle 32 and extension arm 44.

Figure 2:
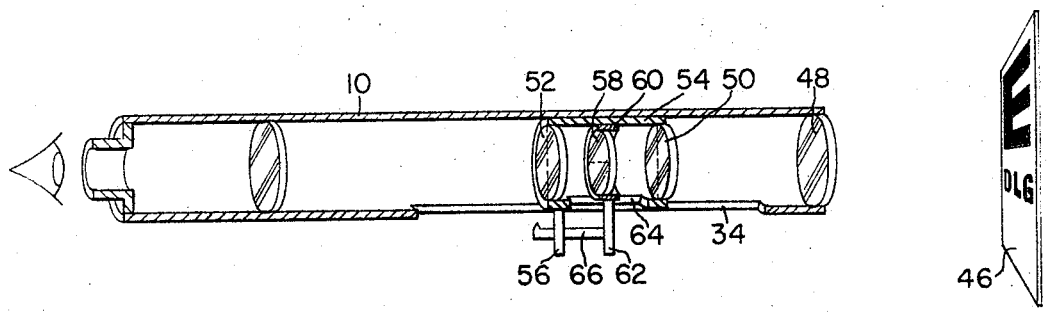
FIG. 2 is a cross-sectional view of a second embodiment of the invention in an optometer.

Referring now to FIG. 2, there is shown an optometer which utilizes a second embodiment of the present invention. All elements are the same as those shown in FIG. 1 with the exception of the target, the collimating lens arrangement, and the cylindrical lens systems. Target 46, a visual acuity chart, for example, is mounted a chosen distance from the instrument, is illuminated by means, not shown, and does not rotate with the instrument. A collimating spherical converging lens 48 is positioned in the posterior end of tube 10 with a focal length equal to the distance between lens 48 and target 46. If this distance is great enough, lens 48 may be omitted entirely, as target 46 may then be considered collimated already. Lens 48 may be omitted entirely in any case if linear movement relationships are not desired as explained below.

The first cylindrical lens system consists of converging cylindrical lenses 50 and 52 with axes shown by dotted lines mounted in holder 54 movable axially within tube 10 by means of handle 56 extending through slot 34 in tube 10. This first cylindrical lens system forms a first image segment of collimated target 46 in a first image plane which coincides with the anterior focal plane of the combination of lenses 50 and 52 regardless of the axial position of holder 54. The first image segment thus moves at the same rate as holder 54, a linear movement relationship, and the first image plane is always a fixed distance from lens 52. This distance, however, is not equal to the equivalent focal length of the lens combination but is determined by the focal lengths and separation of the two lenses. Also, the first image segment has a constant magnification relative to target 46 equal to $f_{50,52}/f_{48}$ where $f_{50,52}$ is the equivalent focal length of the combination of lenses 50 and 52.

The second cylindrical lens system consists of converging lens 58 with its axis orthogonal to the axis of the first cylindrical lens system. Lens 58 is mounted in holder 60 movable axially within holder 54 by means of handle 62 extending through slot 64 in holder 54 and slot 34 in tube 10. This second cylindrical lens system forms a second image segment of collimated target 46 in a second image plane which coincides with the anterior focal plane of lens 58 regardless of the axial position of lens 58. The second image segment thus moves at the same rate as lens 58, a linear movement relationship, and the second image plane is always a fixed distance from lens 58, this distance equal to $f_{58}$. Also, the second image segment has a constant magnification relative to target 46 equal to $f_{58}/f_{48}$.

In this second embodiment the focal lengths of lenses 50, 52, and 58 are chosen such that the anterior principal focal plane of the combination of lenses 50 and 52 is a shorter distance from lens 52 and a greater distance from lens 50 than the focal length of lens 58. This places the second image plane a different distance from lens 58 than the distance of the first image plane from either lens 52 or lens 50, enabling movement of the second image plane throughout a range about the first image plane without movement of lens 58 through lens 52 or through lens 50. It is advantageous also to choose the focal lengths of lenses 50, 52 and 58 such that the magnifications of the target segments in the two meridians are equal. Both of these results may be achieved by a variety of choices of these focal lengths. For example setting $f_{52}=f_{58}=20$ cm. and $f_{50}=40$ cm. and placing lens 50 twenty cm. from lens 52 results in $f_{50,52}=20$ cm. with the anterior principal focal plane of the combination of lenses 50 and 52 being 10 cm. anterior to lens 52. Since $f_{50,52}=f_{58}=20$ cm., the magnifications of the first and second image segments relative to the target, $f_{50,52}/f_{48}$ and $f_{58}/f_{48}$, are equal.

By means of extension arm 66 attached to handle 62 to correct for the difference in position of image planes relative to handles 56 and 62, a single scale may be used with index marks on handle 56 and extension arm 66.

Figure 3:
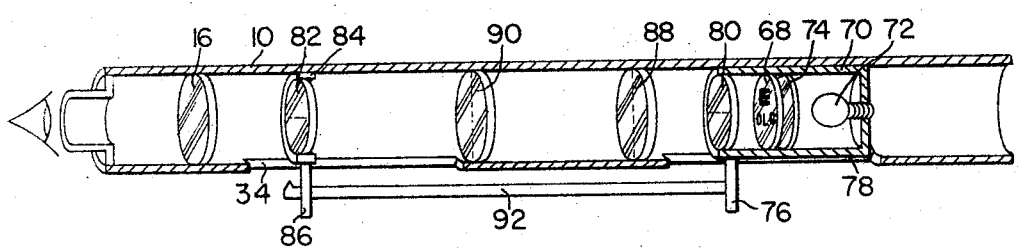
FIG. 3 is a cross-sectional view of a third embodiment of the invention in an optometer.

Referring now to FIG. 3, there is shown an optometer which utilizes a third embodiment of the present invention. All elements are the same as those shown in FIG. 1 with the exception of the target, the collimating arrangement, and the cylindrical lens systems. Target 68, a visual acuity target, for example, is mounted in holder 70 and is illuminated by light source 72 through diffusing plate 74 also mounted in holder 70. Holder 70 is movable axially by means of handle 76 extending through a slot 78 in tube 10.

The first cylindrical lens system consists of converging lenses 88 and 90 with axes shown by dotted lines positioned within tube 10 between target 68 and converging lens 16. Lenses 88 and 90 are spaced from each other such that their adjacent principal focal planes coincide forming a telescopic cylindrical lens system. This first cylindrical lens system forms a first image segment of target 68 in a first image plane, this plane being conjugate through the system to the plane of the target. The distance of this first image plane from lens 90 varies as the axial position of the target varies. The first image segment formed by this system moves in the same direction as the target and at a rate equal to $(f_{90}/f_{80})^2$ times the rate of movement of the target, a linear movement relationship. The first image segment has a constant magnification relative to target 68 equal to $f_{90}/f_{88}$.

The second cylindrical lens system consists of converging cylindrical lenses 80 and 82 with axes orthogonal to the axis of the first cylindrical lens system. Lenses 80 and 82 are also positioned between target 68 and converging lens 16. Lens 80 is a collimating cylindrical lens and is mounted in holder 70 a distance equal to its own focal length from target 68. Lens 82 is mounted on the far side of the first cylindrical lens system from the target in holder 84 which holder is movable axially by means of handle 86 extending through slot 34 in tube 10. This second cylindrical lens system forms a second image segment of target 68 in a second image plane which coincides with the anterior principal focal plane of lens 82 regardless of the axial positions of holder 70 and lens 82. The second image segment thus moves at the same rate as lens 82, a linear movement relationship, and is always a fixed distance from lens 82, this distance equal to $f_{82}$. Also, the second image segment has a constant magnification relative to target 68 equal to $f_{82}/f_{80}$.

In this third embodiment the target and lens 82 must move only through specified ranges in order that the second image plane may be moved throughout a range about the first image plane at any position of the first image plane within the range of the instrument without contact between the elements of the two lens systems. Target 68 is movable within a range beginning farther from lens 88 than a distance equal to $f_{80}$ and ending closer to lens 88 than a distance equal to $f_{88}+(f_{80}-f_{82})(f_{88}/f_{90})^2$. Lens 82 is movable within a range adjacent to lens 90 and extending from lens 90 no farther than a distance equal to $f_{90}-f_{82}+(f_{88}-f_{80})(f_{90}/f_{88})^2$. With these ranges of movement, the second image plane is always a shorter distance from lens 82 than the first image plane is from lens 90.

A single scale may be used by first making the focal lengths of lenses 88 and 90 equal and then by providing extension arm 92 attached to handle 76 with index marks on handle 86 and extension arm 92 to correct for the difference in position of image planes relative to handles 76 and 86.

Equal magnifications of the two target image segments are obtained by choosing $f_1$, $f_2$, $f_3$, and $f_4$ such that $f_{90}/f_{88}=f_{82}/f_{80}$.

As an example, the following focal lengths may be used to obtain both a single scale and equal magnifications: $f_{80}=f_{82}=5$ cm.; $f_{88}=f_{90}=20$ cm. The allowable ranges of target movement and lens 82 movement are easily calculated using these values and the relationships stated above.

It is to be understood that a wide variety of cylindrical lens systems may be used for the first and second cylindrical lens systems described in the present invention. Diverging cylindrical lens elements may be incorporated for certain purposes as effectively as converging cylindrical lens elements. Also additional lens system-target movement relationships may be used. Although it is advantageous to design such lens systems to give equal magnification of the two image segments relative to the target and also to allow the use of a single linear scale, this is not essential to the operation of the basic instrument described whose primary advantage is the facilitation of simultaneous bimeridional measurement of a subject lens by allowing each of two target image segments to pass through the plane of one another.

What is claimed is:

1. In an instrument for measuring the refractive power of a subject lens, said instrument employing a converging lens, and a target positioned on the posterior side of said converging lens, said subject lens located on the anterior side of said converging lens, means for projecting an image of each of at least two orthogonal segments of said target in a plurality of positions along the instrument axis in the object space of said converging lens comprising in combination:

(a) a first cylindrical lens system positioned along the instrument axis between said target and said converging lens for projecting a first target image segment aligned with the axis of said first lens system in a first image plane, said first image plane being within a first selected range along said instrument axis;

(b) first adjusting means for altering the relative position of said target and said first lens system for projecting said first target image segment in said first image plane at a position within said first selected range resulting in neutralization of said subject lens in the meridian perpendicular to said first lens system axis;

(c) a second cylindrical lens system having an axis orthogonal to said first system positioned along the instrument axis between said target and said converging lens for projecting a second target image segment aligned with the axis of said second system in a second image plane, said second image plane being within a second selected range about said first image plane;

(d) second adjusting means for altering the position of said second lens system relative to said target for projecting said second target image segment in said second image plane at a position within said second selected range resulting in neutralization of said subject lens in the meridian perpendicular to said second lens system axis; and (e) indicator means for measuring the relative position of said converging lens and said first and second lens systems.

2. The apparatus of claim 1 wherein said target is fixed, said first cylindrical lens system is movable along said instrument axis, said first cylindrical lens system has its principal focal plane a first fixed distance from said first system, said second cylindrical lens system is movable along said instrument axis, and said second cylindrical lens system has its principal focal plane a second fixed distance from said second system, said second fixed distance unequal to said first fixed distance.

3. The apparatus of claim 2 wherein said first cylindrical lens is positioned between said first cylindrical lens system and said target a distance from said target equal to the focal length of said second lens, said second lens having an axis aligned with the axis of said first lens; said second cylindrical lens system comprises a third converging cylindrical lens, said third lens having a focal length different from the focal length of said first lens; and a fourth converging cylindrical lens is positioned between said second cylindrical lens system and said target a distance from said target equal to the focal length of said fourth lens, said fourth lens having an axis aligned with the axis of said third lens, said fourth lens having a focal length different from the focal length of said second lens.

4. The apparatus of claim 3 wherein the ratio of the focal lengths of said first and second cylindrical lenses equals that of said third and fourth cylindrical lenses.

5. The apparatus of claim 2 wherein a spherical converging lens is positioned at a distance equal to its focal length from said target, said first cylindrical lens system comprises first and second converging cylindrical lenses having aligned axes slideably mounted together in consecutive order anterior to said spherical lens, and said second cylindrical lens system comprises a third converging cylindrical lens slideably mounted between said first and second cylindrical lenses, the principal focal plane of said first cylindrical lens system lying a distance from said second cylindrical lens less than the focal length of said third cylindrical lens and a distance from said first cylindrical lens greater than the focal length of said third cylindrical lens.

6. The apparatus of claim 5 wherein the equivalent focal length of said first cylindrical lens system is equal to the focal length of said third cylindrical lens.

7. The apparatus of claim 1 wherein said target is movable along said instrument axis, said first cylindrical lens system comprises a first fixed converging cylindrical lens and a second fixed converging cylindrical lens with axes aligned, said first cylindrical lens located between said target and said second cylindrical lens and positioned from said second cyclindrical lens a distance equal to the sum of the focal lengths of said first and second cylindrical lenses; said second cylindrical lens system comprises a third converging cylindrical lens positioned a distance equal to its focal length from said target and a fourth converging cylindrical lens having axis aligned with said third cylindrical lens, said fourth cylindrical lens movable along said instrument axis on the far side of said first cylindrical lens system from said third cylindrical lens, said target movable within a range beginning farther from said first cylindrical lens than a distance equal to the focal length of said third cylindrical lens and ending closer to said first cylindrical lens than a distance equal to $f_1 + (f_2 - f_4)(f_1/f_2)^2$, said fourth cylindrical lens movable within a range adjacent to said second cylindrical lens and extending from said second cylindrical lens no farther than a distance equal to $f_2 - f_4 + (f_1 - f_3)(f_2/f_1)^2$.

8. The apparatus of claim 7 wherein the ratio of the focal lengths of said first and second cylindrical lenses is equal to the ratio of the focal lengths of said third and fourth cylindrical lenses.

9. The apparatus of claim 7 wherein the focal lengths of said first and second cylindrical lenses are equal.

References Cited

UNITED STATES PATENTS

| | | | |
|---|---|---|---|
| 1,070,631 | 8/1913 | Rodgers | 351—27 |
| 1,204,030 | 11/1916 | Kellner | 356—125 |
| 1,542,112 | 6/1925 | Tillyer | 356—125 |
| 667,973 | 2/1901 | Cross | 351—27 |

OTHER REFERENCES

Donald Whitney, "An Automatic Focusing Device for Ophthalmic Lenses," American Journal of Optometry & Archives of American Academy of Optometry, vol. 35, No. 4, April 1958, pp. 182–190.

DAVID SCHONBERG, Primary Examiner

P. A. SACHER, Assistant Examiner

U.S. Cl. X.R.

351—6, 13, 17, 34

UNITED STATES PATENT OFFICE
CERTIFICATE OF CORRECTION

Patent No. 3,664,631    Dated May 23, 1972

Inventor(s) David Guyton

It is certified that error appears in the above-identified patent and that said Letters Patent are hereby corrected as shown below:

Column 1, line 37, - "stimulate" should be "simulate"

Column 2, line 7, - "approximately" should be "appropriately"

Column 3, line 15, - "subjcet" should be "subject"

Column 4, line 32, - "with" should be "within"

in Claim 3, line 2,    - between "lens" and "is" insert: ". . system comprises a first converging cylindrical lens; a second converging cylindrical lens . ."

Signed and sealed this 19th day of February 1974.

(SEAL)
Attest:

EDWARD M. FLETCHER, JR.
Attesting Officer

C. MARSHALL DANN
Commissioner of Patents